United States Patent [19]

Hanna

[11] Patent Number: 4,670,929
[45] Date of Patent: Jun. 9, 1987

[54] VEHICLE WASHING APPARATUS AND BRUSH CONSTRUCTION

[76] Inventor: Daniel C. Hanna, 1133 SW. Rivington Dr., Portland, Oreg. 97201

[21] Appl. No.: 747,340

[22] Filed: Jun. 21, 1985

[51] Int. Cl.⁴ .............................................. B60S 3/06
[52] U.S. Cl. ................................ 15/53 AB; 15/97 B; 15/DIG. 2; 15/179; 15/183
[58] Field of Search .............. 15/97 B, DIG. 2, 53 A, 15/53 AB, 53 B, 179, 181, 183, 230, 230.14, 230.16, 230.17, 230.19

[56] References Cited

U.S. PATENT DOCUMENTS

| | | | |
|---|---|---|---|
| 3,350,733 | 11/1967 | Hanna | 15/53 AB |
| 3,438,077 | 4/1969 | Eubanks | 15/53 A |
| 3,613,140 | 10/1971 | Oas | 15/179 X |
| 3,694,844 | 10/1972 | Welter | 15/182 |
| 3,772,723 | 11/1973 | Krimm | 15/179 X |
| 3,939,521 | 2/1976 | Clark | 15/179 |
| 4,142,267 | 3/1979 | Clark | 15/179 |
| 4,377,878 | 3/1983 | Pecora | 15/97 B |
| 4,441,226 | 4/1984 | Hanna | 15/53 AB |
| 4,567,619 | 2/1986 | Clark | 15/97 B |

FOREIGN PATENT DOCUMENTS 1185331 3/1970 United Kingdom ........... 15/DIG. 2

Primary Examiner—Edward L. Roberts
Attorney, Agent, or Firm—Klarquist, Sparkman, Campbell, Leigh & Whinston

[57] ABSTRACT

A vehicle washing apparatus is described with a brush construction having a high density section positioned at an elevation above the bumpers of vehicles. This latter section may be of a greater diameter than the diameter of adjoining sections of the brush. In addition, the washing elements of these adjoining sections may be arranged in vertical rows with relatively long flaps which engage the vehicle for cleaning purposes and shorter flaps which help to space a core of the brush away from the surfaces of the vehicle. Also, the washing elements may be in horizontal rows with each row projecting from an associated annular washing material support flange. The brush construction may also include an upper window cleaning brush having a first portion of a first diameter and a second upper portion of a second diameter greater than the first diameter. The window brush is typically of a density which is less than the density of the other sections of the brush.

15 Claims, 13 Drawing Figures

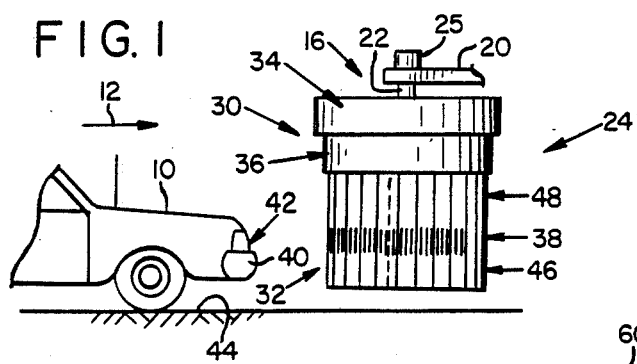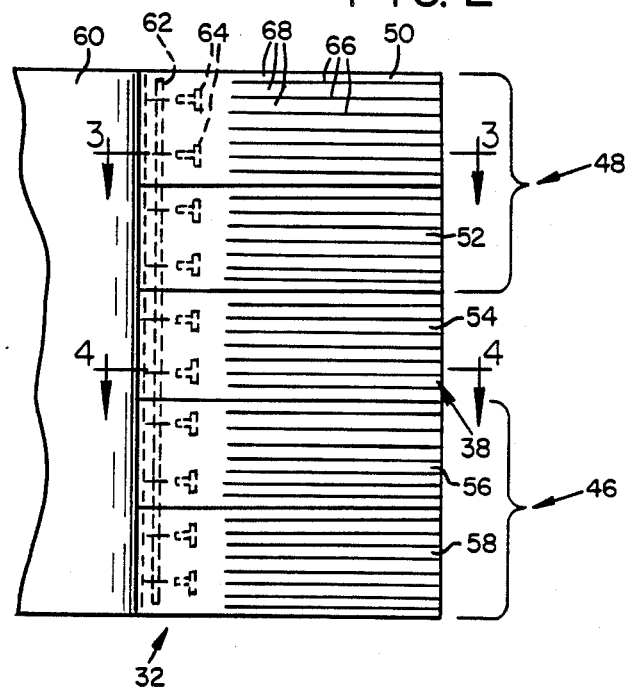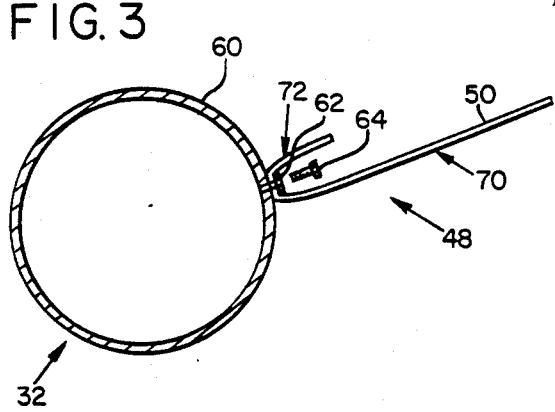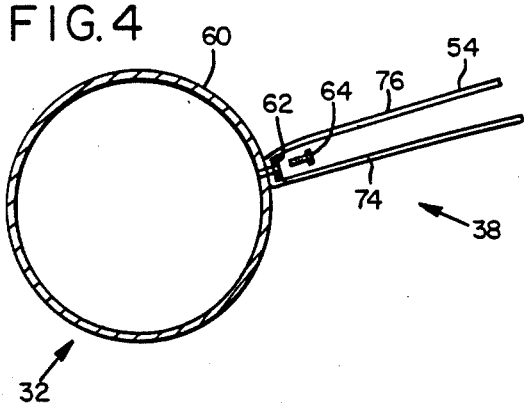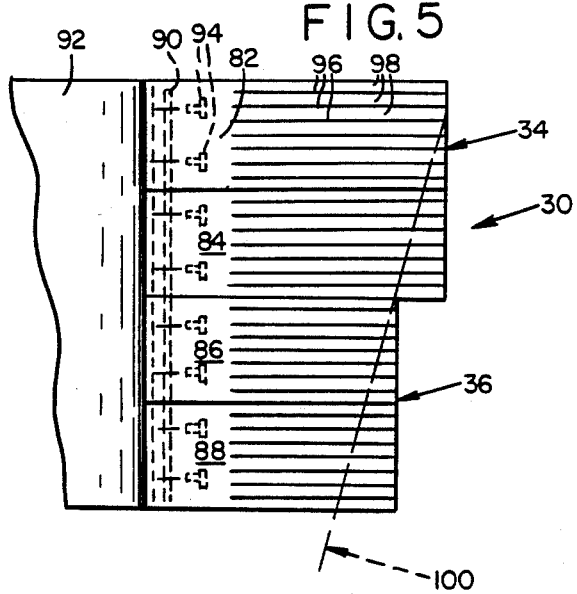

VEHICLE WASHING APPARATUS AND BRUSH CONSTRUCTION

BACKGROUND OF THE INVENTION

The present invetion relates to a vehicle washing apparatus having an improved brush construction. More specifically, the invention relates to such an apparatus which supports the brush construction for rotation about a generally vertical axis for cleaning the front, a side and rear of the vehicle.

Heretofore, a number of prior art devices and brush constructions have been employed for cleaning vehicles. One such device comprises a "wraparound" brush and is disclosed in U.S. Pat. No. 3,350,773 of Hanna. In such a device, the brush is rotated about a vertical axis. As the vehicle is advanced through a vehicle wash, the brush travels from the front of the vehicle, along a side of the vehicle, and along the rear of the vehicle. The brush includes bristles uniformly spaced about and mounted to a central small diameter core. These bristles extend outwardly and against the surfaces of the vehicle being cleaned.

Other brush constructions are also known in the art. For example, U.S. Pat. No. 3,694,844 of Welter discloses a brush construction having a central core to which a spirally wound pattern of bristles is attached. A special hub construction is utilized for securing the core and supported brush to a central shaft. The shaft is rotated to rotate the brush during vehicle cleaning.

Another vehicle washing apparatus and brush construction is disclosed in U.S. Pat. No. 4,441,226 of Hanna. This device has an upper cylindrical rotary brush of a first uniform diameter and lower cylindrical rotary brush of a second smaller uniform diameter. These brushes are stacked endwise and are attached to a vertically disposed rotatable shaft. The upper brush is comprised of a lightweight cloth-like material suitable for scrubbing the side windows of a car. Also, the upper brush is of a larger diameter than the lower brush to facilitate more effective engagement with and cleaning of vehicle window surfaces. In addition, the lower brush is comprised of a material which becomes heavy when laden with water so as to more effectively clean the generally dirty metallic portions of a car below the windows.

These known devices suffer from a number of deficiencies. For example, they exhibit drawbacks in cleaning recesses commonly present immediately above the bumpers at the front and rear of vehicles. In addition, although solyed to some extent by the device of U.S. Pat. No. 4,441,226 of Hanna, such devices can damage antennas, mirrors, license plates and other projecting portions of vehicles.

Therefore, a need exists for an improved vehicle washing apparatus and brush construction directed toward overcoming these and other problems of prior art devices.

SUMMARY OF THE INVENTION

By way of example, the brush construction of the present invention is applicable to rotary brush vehicle washing devices. Such devices are driven by a hydraulic motor and mounted to a fully passive support structure that guides brush movement about the front end, a side and rear end of a vehicle as the vehicle advances along a conveyor track.

More specifically, the invention comprises a rotary brush mechanism which includes a lower substantially cylindrical brush for mounting to a vertically disposed rotable shaft. A hydraulic drive motor is operatively connected to the shaft for rotating the lower brush. The lower brush includes a high density brush section which is supported to engage the vehicle at an elevation above the bumper. This high density section more effectively reaches into and cleans recesses typically found above the bumpers, such as in the grillwork. This latter section may also be of a greater diameter than adjoining sections of the lower brush. This increased diameter enhances the capability of this brush section to reach into and clean the areas above the bumpers.

As another aspect of the present invention, the high density section is positioned intermediate the ends of the lower brush. In addition, less dense brush sections are provided above and below the high density section. The lowermost section, because of its reduced density, tends to clean license plates without bending such plates. Also, this lowermost section approaches the bumpers closer than would be the case if the section were of higher density. As a result, the high density section also moves closer to the vehicle for more effective cleaning.

As still another aspect of the present invention, the brush has washing elements constructed to cushion and maintain a core which supports such elements a desired distance from the surfaces of a vehicle being washed. This reduces the possibility of the core contacting and damaging mirrors and other portions of the vehicle.

As a further aspect of one embodiment of the present invention, the lowermost section of the lower brush is comprised of rows of horizontally projecting vehicle washing elements. Such horizontal elements minimize the risk of bending the license plates of the vehicles being washed. The uppermost section of the lower brush may also be comprised of rows of horizontally projecting vehicle washing elements.

As another aspect of the present invention, washing element support rings with horizontal flanges are secured to the core. Annular sheets of washing material with radial slits are mounted to the flanges concentrically with the support rings. Alternately, separate pieces of washing material may be mounted to the support flanges, such pieces being provided with longitudinal slits.

As still another aspect of the present invention, the brush construction may include a substantially cylindrical upper window washing brush. Moreover, the upper and lower brush sections are stacked endwise along a supporting rotatable shaft. The upper brush may be of a greater diameter than the lower brush. Also, in one form, the upper brush has upper and lower brush sections, the upper section being of a greater diameter than the lower brush section. This enables the upper brush to more effectively clean sloped window surfaces of many vehicles.

The foregoing and other objects, features, and advantages of the present invention will become more apparent from the following detailed description which proceeds with reference to the accompanying drawings.

BRIEF DESCRIPTION OF THE DRAWINGS

In the drawings:

FIG. 1 is a side elevational view of a vehicle washing apparatus including a brush construction in accordance with one embodiment of the present invention;

FIG. 2 is a side elevational view of a portion of the lower brush of the brush construction of FIG. 1;

FIG. 3 is a cross-sectional view of the lower brush of FIG. 2, taken along lines 3—3 of FIG. 2;

FIG. 4 is a cross-sectional view of the lower brush of FIG. 2, taken along lines 4—4 of FIG. 2;

FIG. 5 is a side elevational view of a portion of the upper brush of the brush construction of FIG. 1;

DETAILED DESCRIPTION OF PREFERRED EMBODIMENTS

Figure 8:
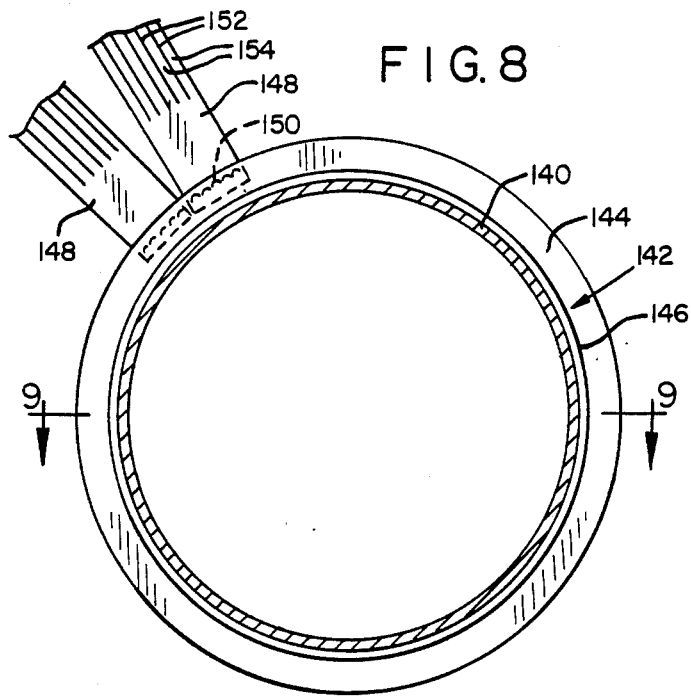
FIG. 8 is a cross-sectional view of the brush construction of FIG. 7, taken along lines 8—8 of FIG. 7.

FIG. 1 shows a preferred "wraparound" brushing mechanism 16 supporting a rotary brush assembly 24, in accordance with one form of the invention in a car wash installation. The overall structure and operation of a typical "wraparound" brushing mechanism is disclosed in U.S. Pat. No. 3,350,733 of Hanna. However, it will be appreciated that the successful operation of the present invention is not restricted to brushing mechanisms of this type.

With reference to FIG. 1, a vehicle washing operation is accomplished by advancing a car 10 in the direction of arrow 12. The car follows a track (not shown) through a bay having at least one such car brushing mechanism 16 positioned for engaging a vehicle traveling through the vehicle wash. Typically, a pair of brushing mechanisms 16 are provided along opposite sides of the path of vehicle travel for engaging and cleaning the passing vehicle. Such brushing mechanisms operate in a complimentary fashion so that each scrubs sequentially a portion of the front end, an adjacent side, and a portion of the rear end of the vehicle. Upon engagement with the vehicle 10 advancing in directon 12, the brushing sequence commences. The brushing mechanism 16 includes a support arm 20 to which a rotatable shaft 22 is coupled. A hydraulic motor 25 drives the shaft 22 and thereby rotates the brush assembly 24, which is coupled to the shaft.

The illustrated FIG. 1 brush assembly 24 includes an upper rotary brush 30 and a lower rotary brush 32 which are stacked endwise and attached to the vertically disposed shaft 22. When shaft 22 is driven, the upper and lower brushes 30, 32 are rotated and travel against the surfaces of car 10 for cleaning purposes. The brush supporting structure holds the brushes 30, 32 in the path of the advancing vehicle. When the brushes engage the front end of the vehicle, the support structure urges the rotating brushes against the vehicle. The structure also moves pivotally, as the vehicle advances, to guide the brushes along the front end of the vehicle to a side thereof, rearwardly along the side of the vehicle, and across a portion of the rear end of the vehicle.

Figure 6:
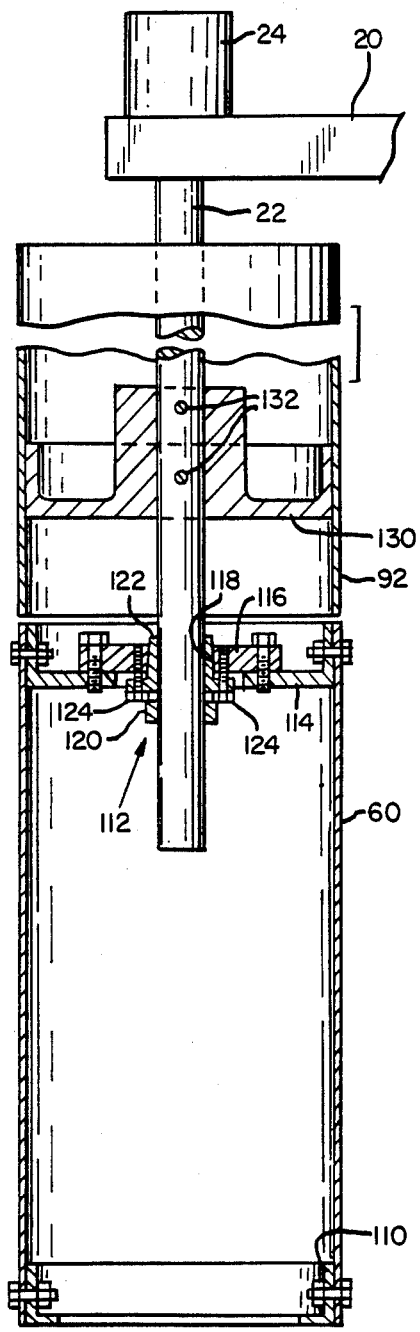
FIG. 6 is a vertical sectional view, partially broken away, of the core of the brush construction of FIG. 1.

As shown, the upper and lower brushes 30, 32 are of generally cylindrical shape. In addition, the upper brush 30 is supported at a location for engaging the side windows of the vehicle 10. Typically, brush 30 is comprised of a lightweight, cloth-like material suitable for scrubbing the side windows of the vehicle. One suitable material is available from Ozite Corporation of Libertyville, Ill., and designated "OZITE" C-1001 Chamois. This material is relatively tightly woven and absorbs about two ounces of water per square foot. The larger diameter of upper brush 30, in comparison to the diameter of lower brush 32, promotes more effective engagement with the surfaces of the vehicle side windows. In addition, the upper brush is comprised of an upper brush section 34 of a first diameter and a lower brush section 36 of a second diameter less than the first diameter. With the periphery of the upper brush 30 stepped or contoured in this manner, more effective cleaning of sloped vehicle windows results. That is, the upper section 34 of brush 30 reaches those window surfaces which are sloped away from the sides of the vehicle while the brush section 36 cleans the lower window surfaces. In addition, the brush section 36 does not hold the upper brush section 34 out of contact with the vehicle windows. Additional structural details of upper brush 30 are described below in connection with FIGS. 5 and 6.

The lower brush 32 is typically comprised of a washing material which becomes relatively heavy when laden with water and, therefore, is suitable for cleaning the generally dirty metallic portions of a vehicle. For example, Ozite Corporation sells a suitable material under the designation "OZITE" C-1221. This material absorbs about fourteen ounces of water per square foot. In addition, as explained in greater detail below, the lower brush includes a section 38 of a relatively high density in comparison to the other sections of the lower brush 32. This section 38 is supported so as to engage the vehicle 10 at an elevation approximately above the bumper 40 of the vehicle. As a result, the washing material of section 38 is applied against the recessed grill areas of the vehicle. In addition, this section cleans the recessed areas at the rear of the vehicle above the rear bumper. As a typical example, on many cars with standard tires, the top 42 of bumper 40 is typically about 21 inches above the floor 44 which supports the vehicle. Thus, with section 38 supported at approximately this elevation, the washing material of this section bears against and more effectively cleans the grillwork and other difficult to clean areas of the vehicle.

In the illustrated preferred embodiment, the section 38 is positioned intermediate the ends of the lower brush 32. That is, the lower brush 32 includes sections 46 and 48 respectively below and above section 38.

Referring to FIGS. 2, 3, and 4, the washing material of lower brush 32 includes plural flexible panels, five such panels 50, 52, 54, 56, and 58 being shown in FIG. 2. These panels are secured to a cylindrical core 60 by an elongated strip 62 which clamps the panels in place. Fasteners, such as screws 64 (shown in exaggerated size in FIG. 2) hold the strip 62 in place. The panels are arranged in vertical rows about the circumference of the core 60. For a typical twelve inch diameter core, eighteen of the strips 62 are provided at equal distances about the circumference of the core. The panels are slit, with some of the slits being indicated by the number 66, to provide plural fingers, such as indicated at 68, of approximately one-inch width. These fingers reach into vehicle recesses as the brush is rotated for cleaning purposes.

The panels 52, 54, 56, and 58 which form the brush sections 46 and 48 are typically fastened in an identical manner to the core 60 as shown in FIG. 3. That is, the strip 62 clamps an intermediate portion of the panel 50 to the core so as to provide a first long flap 70 and a shorter flap 72. The short flap 72 as well as the short flaps of the other panels of these sections cushion the core and help to hold the core away from the vehicle. Thus, the flaps 72 help to establish a minimum distance between the core and the vehicle being washed so as to protect the vehicle from damage.

As a more specific illustrative example, the flap 70 may be approximately nineteen inches long while the flap 72 is about six inches long. In this case, with a twelve inch core, the diameter of this cushion, measured from the outer edge of a flap 72 to the outer edge of flap 72 at the opposite side of the core, is approximately twenty-four inches. In addition, the outer diameter of the brush section from the outer edge of flap 70 to the outer edge of an oppositely positioned flap 70 is about forty-eight inches.

The washing material of section 38 is secured to the core 60 in the same manner as the panel 50. However, as shown in FIG. 4, its flaps 74 and 76 are of approximately the same length. Also, in the embodiment of FIG. 1, flaps 74 and 76 are the same length as the flaps 70. Because of the length of flap 76, in comparison to the length of the shortened flap 72, the density of the brush section 38 is approximately twice the density of the adjoining sections 46 and 48.

It should also be noted, as can be seen from FIG. 2, that the height of each of the brush sections 46 and 48 is approximately twice the height of section 38. As a specific example, the sections 46 and 48 may be fourteen inches high while the section 38 is seven inches high.

With this construction, the relatively dense section 38 bears against and cleans the recessed areas of the vehicle above the bumpers. In addition, because of the lower density of the lower brush section 46, this lower section approaches the bumper 40 closer than if the lower section were of the same density as the center section 38. Consequently, this enables the brush section 38 and its fingers 68 to reach further into the recessed areas of the vehicle. Also, the flaps 72 tend to hold the brush construction a desired distance away from the vehicle to prevent the core 60 from contacting the vehicle during washing.

With reference to FIG. 5, the upper or window brush section 30 will next be described. Brush 30 also includes plural panels, in this case panels 82, 84, 86 and 88, secured by a strip 90 to an upper core 92. Fasteners, such as screws indicated at 94, hold the strip 90 in place to clamp the panels to the core. In addition, the panels are provided with plural slits 96 which subdivide the panels into fingers 98 in the same manner as the previously described panels 50 through 58.

In the construction of FIG. 5, the core 92 is of the same diameter as the core 60. In addition, the upper brush sections 34 and 36 are, in the preferred embodiment, of a lower density than the brush sections of the lower brush 32. For example, a typical upper brush 30 would have nine vertical rows of panels secured by respective strips spaced equally about the circumference of the core 92. These panels are secured to the core in the same manner as illustrated in FIG. 3. In addition, an exemplary height of the upper brush 30 is twenty-eight inches with each of the sections 34, 36 being fourteen inches high and the panels 82 through 88 being seven inches high. Also, the length of the long flaps of the panels forming the brush section 36 are typically nineteen or twenty inches, thereby making the overall diameter of the brush section 36 approximately fifty to fifty-two inches. In addition, the long flaps of the panels of the upper brush section 34 are about twenty-one inches. This makes the overall diameter of the upper brush section 34 about fifty-four inches. As apparent from FIG. 5, the panels easily reach and clean the sloped surfaces 100 of vehicle windows found in many cars.

With reference to FIG. 5, the core 60 is typically of aluminum or other suitably strong, rigid rust-resistant material. An interior stiffening ring 110 is mounted to the lower end of the core 60 for reinforcing purposes. The upper end of core 60 is secured to the shaft 22 by a hub assembly 112 which is similar to the assembly described in U.S. Pat. No. 3,694,844 of Welter. In this assembly, an annular brush mounting flange 114 is secured to the interior surface of the core 60. An annular locking plate 116, having a tapered bore 118, is secured to the mounting flange 114. A shaft collar 120 surrounds the shaft 22 and has a taper lock bushing end 122 which is received by the tapered bore 118. Each tapered bushing 122 is provided with a slit, not shown, which allows it to be clamped tightly onto the shaft 22 when tap screws 124 are threaded into tapped bores in the plate 116. The core 60, and thus the lower brush 32, is driven in rotations by the shaft 22. A key may be provided but is typically not necessary.

A pair of annular mounts 130 secure the core 92 to the shaft 22. Set screws 132 couple the mounts 130 to the shaft 22. The periphery of the mounts 130 are secured, as by bolts, to the core. Thus, the upper brush 30 also rotates with the shaft 22.

Figure 7:
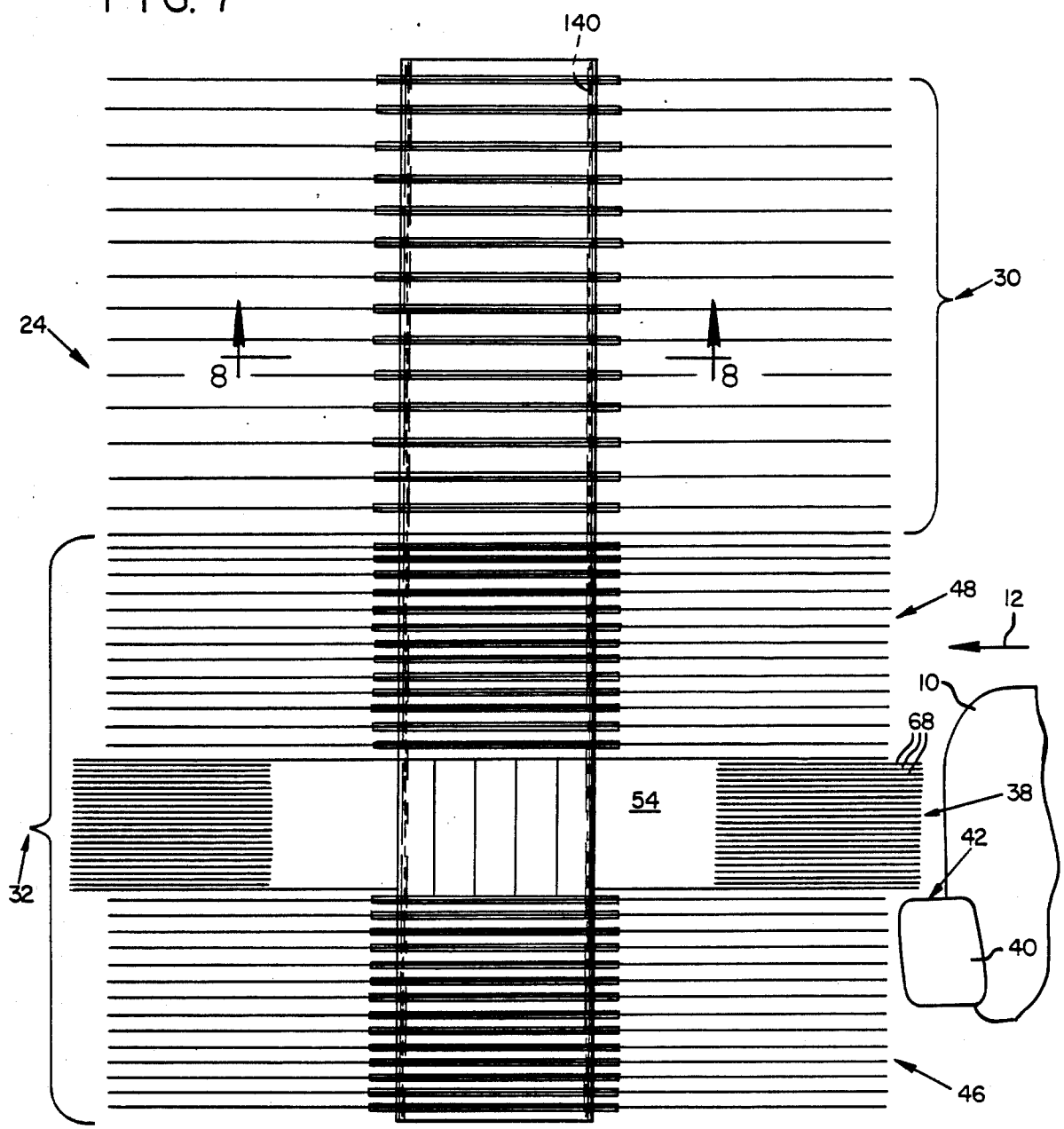
FIG. 7 is a side elevational view of an alternate embodiment of a brush construction in accordance with the present invention.

FIG. 7 illustrates an alternate embodiment of the brush construction 24. In the embodiment of FIG. 7, the grill cleaning section 38 also comprises plural vertically oriented panels, one of which is numbered as 54 with fingers 68. The panels 54 are secured, as shown in FIG. 4 to a core 140. Unlike the two section cores 60, 92 of FIG. 5, the core 140 extends the full length of the brush construction.

In the FIG. 7 form of the invention, thirty panel holding strips are used and spaced about the circumference of the core. Also, the diameter of the FIG. 7 brush section 38 is greater than the diameter of adjacent portions of the brush. This enlarged diameter enhances the extent to which the fingers 68 enter and clean the recessed areas above the bumper 40 of the vehicle 10.

Figure 9:
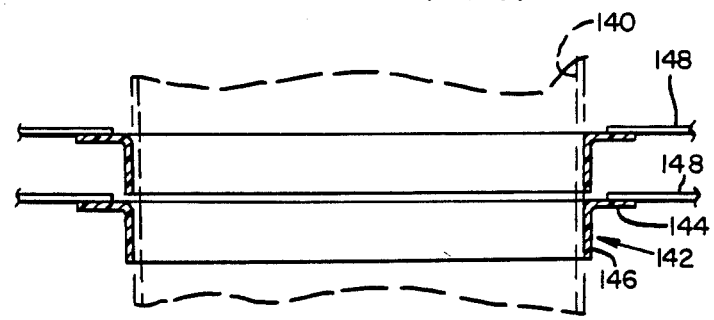
FIG. 9 is a cross-sectional view of a portion of the brush construction of FIG. 7, taken along lines 9—9 of FIG. 8.

To illustrate the variety of constructions which may be employed, the washing material used in the upper brush 30, and also in the lower brush sections 46, 48 are comprised of rows of horizontally projecting washing elements. Referring to FIGS. 8 and 9, each of these washing elements is secured to the core 140 by an annular ring 142. Ring 142 is of angular construction with an outwardly projecting washing material supporting flange portion 144 and a sleeve portion 146. Typically, ring 142 is of a durable material such as polyethylene.

The sleeve 146 tightly abuts the core and is secured to the core, as by screws. In the FIGS. 8 and 9 forms, the washing elements include plural panel sections 148 which are secured, as by stitching 150, to the flanges 144. The panel sections 148 are provided with slits 152 directed inwardly from their outer edges so as to divide the panels 148 into fingers 154 which clean the surfaces of the vehicle. The flanges 144 help to hold the panel sections 148 of each washing element in a horizontal plane. Also, the panel sections of adjacent elements are spaced from one another. When so supported, tangling of the fingers of the panel sections with the fingers of adjacent upper and lower panel sections is minimized.

Figure 10:
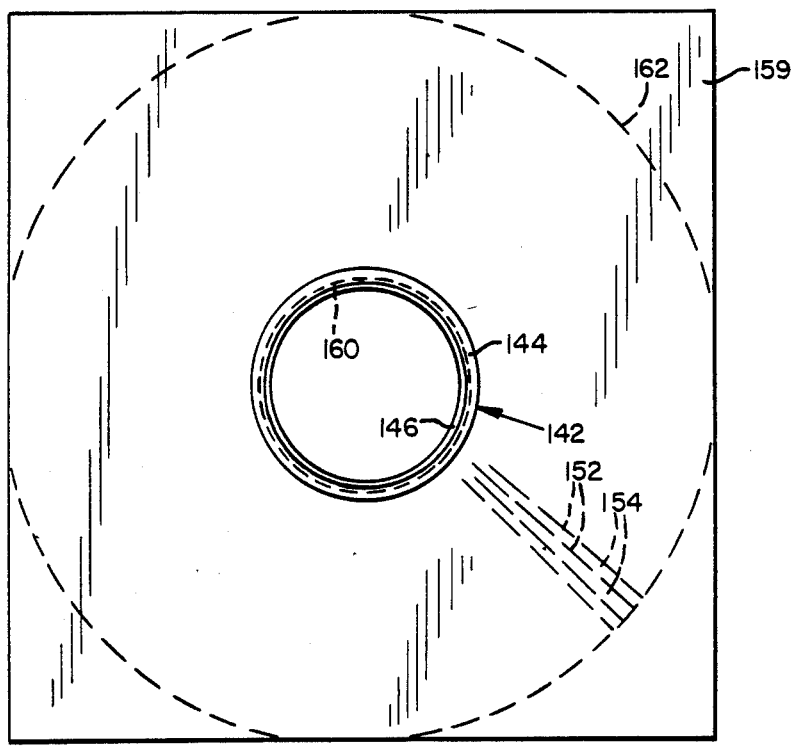
FIG. 10 is a plan view illustrating one manner of manufacturing a vehicle washing element utilized in the brush construction of FIG. 7.

FIG. 10 illustrates another form of washing element suitable for use in the embodiment of FIG. 7. In the FIG. 10 construction, a square of fabric 159 of the desired dimension, such as forty-eight inches is provided. This piece of fabric is trimmed to provide a central circular opening 160 and also to provide a circular outer periphery 162. The circle 160 is of a greater diameter than the outer diameter of the sleeve 146, but of a lesser diameter than the flange 144. Thus, upon positioning the sleeve 146 within opening 160, the portion of the fabric bounding opening 160 bears against the flange 144 and is fastened thereto. The slits 152 are cut in the fabric and extend radially inwardly from the outer perimeter 162 of the washing element. Thus, a convenient and easy method of manufacturing individual washing elements is provided.

Referring again to FIG. 7, with the individual washing elements of the lower brush section 46 oriented horizontally as shown, they tend to clean license plates and other projections without bending the plates. Also, a typical section 46 is fourteen inches high and has ten spaced apart individual horizontal washing elements. A typical density of washing elements is five such elements for each seven inches of core, although the illustrated embodiment has a greater number of such rows. Likewise, the section 48 is typically of fourteen inches high and has a similar number of washing elements as does the section 46. In addition, the window or upper brush 30 is typically twenty-eight inches high. The brush section 30 has a lower density of washing elements than the sections 46 and 48. As a typical example, four such washing elements are provided for each seven inches core. This provides a total of sixteen such washing elements for twenty-eight inches of core, although only fifteen are shown in FIG. 7.

Like the FIG. 1 form of the invention, the FIG. 7 embodiment therefore includes a higher density section 38 for cleaning the areas above the bumper of a vehicle. In addition, the FIG. 7 form utilizes a brush section 38 of a larger diameter than adjacent brush sections 46, 48. Also, the FIG. 7 upper brush 30 is designed to clean windows and tends, because of its lesser density and the horizontal orientation of the washing elements, not to damage antennas and other projections. However, because this form of brush 30 is of a constant diameter, it is somewhat less effective in cleaning slanted window surfaces than the FIG. 1 form of brush 30.

Figure 11:
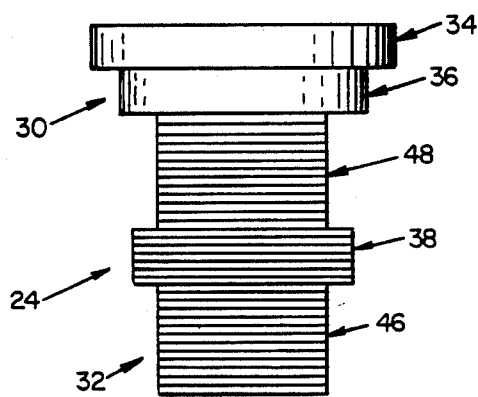
FIG. 11 is a side elevational view of another embodiment of a brush construction in accordance with the present invention.

The FIG. 11 form of the invention comprises a brush construction 24 having an upper brush 30 like the FIG. 1 brush 30. In addition, the sections 46 and 48 of the lower brush 32 are oriented horizontally in the same manner as in the FIG. 7 form of the invention. Furthermore, the brush section 38 is of a higher density than the sections 46 and 48. However, the FIG. 11 brush section 38 is formed of horizontally oriented washing elements instead of the vertically oriented elements as shown in FIG. 7. Also, like the FIG. 7 form of the invention, the washing elements forming the section 38 are of a greater diameter than the diameter of adjoining brush sections 46, 48.

Figure 12:
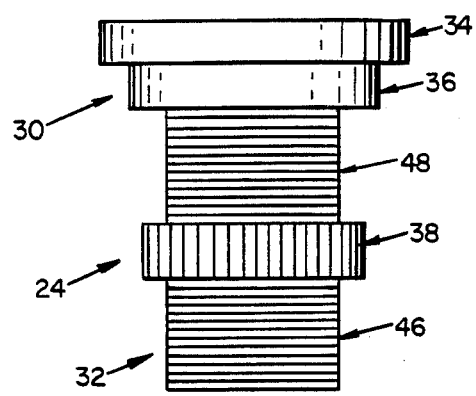
FIG. 12 is a side elevational view of a further embodiment of a brush constuction in accordance with the present invention.
Figure 13:
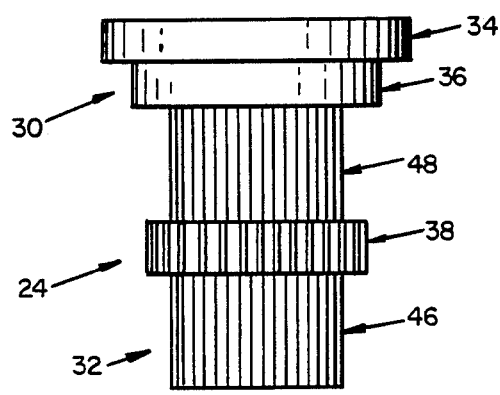
FIG. 13 a side elevational view of a still further embodiment of a brush construction in accordance with the present invention.

The FIGS. 12 and 13 forms of the invention also include upper brushes 30 like the brush 30 of FIG. 1. In addition, the FIG. 12 form of brush construction includes a lower brush 32 which is identical to the brush 32 of FIG. 7. The FIG. 13 lower brush 32 is like the brush of FIG. 7, except that the brush sections 46 and 48 comprise vertically oriented rows of washing material panels instead of the horizontally arranged washing element shown in FIG. 7.

Having illustrated and described the principles of my invention with respect to several preferred embodiments, it will be apparent to those skilled in the art that the invention may be modified in arrangement and detail without departing from the principles thereof. For example, other arrangements, dimensions and spacings of washing materials will be suitable.

I claim as my invention all such modifications as come within the true spirit and scope of the following claims:

1. A vehicle washing brush comprising:
   an elongated central core means for supporting washing material;
   vehicle washing material means mounted to the core means, the vehicle washing material means having a first section of a first density about a first section of the core means of a first length, the first section being intermediate the ends of the core means, the vehicle washing material means having a second section of a second density about a second section of the core means of a second length, the second section being adjacent the first section, the second density being less than the first density and the first length being shorter than the second length;
   the vehicle washing material means including a third section of a third density about a third section of the core means of a third length, the third density being less than the first density, the first section being positioned between the second and third sections and the first length being shorter than the third length.

2. A vehicle washing brush according to claim 1 in which the first and third densities are the same and in which the second and third lengths are each approximately twice the first length.

3. A vehicle washing brush according to claim 1 in which the vehicle washing means includes a fourth window washing section of a fourth density about a fourth section of the core means the fourth density being less than the first, second and third densities, the fourth window washing section also being spaced from the second section by the first and third sections.

4. A vehicle washing brush according to claim 3 in which the vehicle washing material means forms a generally cylindrical brush, the window washing section including a first oortion about the core means of a first diameter and a second portion about the core means of a second diameter greater than the first diameter, the second portion being spaced from the third section by the first portion.

5. A vehicle washing brush according to claim 1 in which the vehicle washing material means forming the second and third sections comprises plural washing elements each extending outwardly from the core means in a plane generally normal to the longitudinal axis of the core means, each such washing element including an associated annular support ring mounted to the core means, the ring having an outwardly projecting washing material support flange generally in the plane of the associated washing element, at least one section of washing material being mounted to the support flange and projecting outwardly therefrom in the plane of the associated washing element.

6. A vehicle washing brush according to claim 5 in which the section of washing material comprises an annular sheet of washing material having an inner circular opening sized smaller than the support flange and having the portion of the sheet bounding the inner opening mounted to the support flange, the outer periphery of the sheet being provided with plural radially inwardly directed slots.

7. A vehicle washing brush according to claim 5 in which the vehicle washing means forming the first section also comprises plural washing elements of the form employed in the second and third sections.

8. A vehicle washing brush comprising:
an elongated central core means for supporting washing material;
vehicle washing material means mounted to the core means, the vehicle washing material means having a first section of a first density about a first section of the core means intermediate the ends of the core means, the vehicle washing material means having a second section about a second section of the core means adjacent the first section, the second section having a density which is less than the first density, and the vehicle washing material means including a third section about a third section of the core means, the first section being positioned between the second and third sections, and the third section having a density which is less than the first density;
the vehicle washing material means forming the second and third sections including panels with first flaps of a first length which project outwardly from the core means a first distance, the panels having second cushioning flaps of a second length shorter than the first length which project outwardly from the core means a second distance less than the first distance, whereby upon rotation of the brush, the second flaps assist in maintaining space between the vehicle surfaces being washed and the core means, and in which the vehicle washing material means forming the first section includes panels with first and second flaps of approximately the same length.

9. A vehicle washing brush comprising:
an elongated central core means for supporting washing material;
vehicle washing material means mounted to the core means, the vehicle washing material means having a first section of a first density about a first section of the core means intermediate the ends of the core means, the vehicle washing material means having a second section of a second density about a second section of the core means adjacent the first section, the second density being less than the first density, and the vehicle washing material means having a third section of a third density, the first section being positioned between the second and third sections, and the third density being less than the first density;
the vehicle washing material means forming the second and third sections including panels with first flaps of a first length which project outwardly from the core means a first distance, the panels having second cushioning flaps of a second length shorter than the first length which project outwardly from the core means a second distance less than the first distance, whereby upon rotation of the brush, the second flaps assist in maintaining space between the vehicle surfaces being washed and the core means, and in which the vehicle washing material means forming the first section includes panels with first and second flaps of approximately the same length;
the vehicle washing apparatus also including plural elongated panel retaining strips mounted about the circumference of the core means, the strips having longitudinal axes parallel to the axis of the core means, the strips clamping the panels to the core means at intermediate portions of the panels to the core means at intermediate portions of the panels such that the first and second flaps project outwardly from the sides of the strips and away from the core means.

10. A vehicle washing brush according to claim 9 in which the second flaps of the second and third sections project outwardly approximately six inches and the first flaps of the second and third sections as well as the first and second flaps of the first section project outwardly approximately nineteen inches.

11. A vehicle washing apparatus comprising:
a brush support structure;
a shaft pivotally mounted to the brush support structure and supported by the support structure in a vertical orientation;
means for rotating the shaft;
a brush assembly mounted to the shaft for rotation therewith, the brush assembly including an elongated vertically disposed core means for supporting washing material, vehicle washing material means mounted to the core means, the vehicle washing material means having a first section of a first density about a first section of the core means, the support structure comprising means for supporting the first section generally above the elevation of vehicle bumpers, the washing material means having a second section of a second density about a second section of the core means adjacent to and below the first section, the second density being less than the first density, the washing material means having a third section of a third density adjacent to and above the first section, the third density being less than the first density, whereby the second section generally engages the bumper and lower regions of the vehicle at the front and rear thereof; and
in which the vehicle washing material means forms a generally cylindrical brush, the diameter of the first section of the vehicle washing means being greater than the diameter of the second and third sections of the brush.

12. A vehicle washing apparatus comprising:
a brush support structure;
a shaft pivotally mounted to the brush support structure and supported by the support structure in a vertical orientation;
means for rotating the shaft;

a brush assembly mounted to the shaft for rotation therewith, the brush assembly including an elongated vertically disposed core means for supporting washing material, vehicle washing material means mounted to the core means, the vehicle washing material means having a first section of a first density about a first section of the core means, the support structure comprisng means for supporting the first section generally above the elevation of vehicle bumpers, the washing material means having a second section of a second density about a second section of the core means adjacent to and below the first section, the second density being less than the first density, whereby the second section generally engages the bumper and lower regions of the vehicle at the front and rear thereof; and in which the first section is of a first length and the second section is of a second length, the vehicle washing material means also including a third section of a third density about a third section of the core means, the third section being of a third length, the third density being less than the first density and the third section being positioned above the first section, and the first length being shorter than the second and third lengths.

13. A vehicle washing apparatus according to claim 12 in which the vehicle washing means includes a fourth window washing section of a fourth density about a fourth section of the core means, the fourth density being less than the first, second and third densities, the fourth window washing section being above the third section, the vehicle washing material means forming a generally cylindrical brush, the window washing section including an upper portion about the core means of a first diameter and a lower portion about the core means of a second diameter greater than the first diameter.

14. A vehicle washing anparatus according to claim 12 in which the second and third lengths are each approximately twice the first length.

15. A vehicle washing apparatus comprising:

a brush support structure;

a shaft pivotally mounted to the brush support structure and supported by the support structure in a vertical orientation;

means for rotating the shaft;

a brush assembly mounted to the shaft for rotation therewith, the brush assembly including an elongated vertically disposed core means for supporting washing material, vehicle washing material means mounted to the core means, the vehicle washing material means having a first section of a first density about a first section of the core means, the support structure comprising means for supporting the first section generally above the elevation of vehicle bumpers, the washing material means having a second section of a second density about a second section of the core means adjacent to and below the first section, the second density being less than the first density, the washing material means having a third section of a third density adjacent to and above the first section, the third density being less than the first density, whereby the second section generally engages the bumper and lower regions of the vehicle at the front and rear thereof; and in which the vehicle washing material means forming the second and third sections includes panels with first flaps of a first length which project outwardly from the core means a first distance, the panels having second cushioning flaps of a second length shorter than the first length which project outwardly from the core means a second distance less than than the first distance, whereby upon rotation of the brush, the second flaps assist in maintaining space between the vehicle surfaces being washed and the core means, and in which the vehicle washing material means forming the first section includes panels with first and second flaps of approximately the same length.

* * * * *

UNITED STATES PATENT AND TRADEMARK OFFICE
CERTIFICATE OF CORRECTION

PATENT NO. : 4,670,929

DATED : June 9, 1987

INVENTOR(S) : Daniel C. Hanna

It is certified that error appears in the above-identified patent and that said Letters Patent is hereby corrected as shown below:

In the Specification:

Col. 1, Line 6, "invetion" should be --invention--;

Col. 1, Line 52, "solyed" should be --solved--;

Col. 2, Line 4, "rotable" should be --rotatable--; and

In the Claims:

Col. 8, Line 53 (Claim 3), after "means" insert a comma'

Col. 8, Line 60 (Claim 4), "oortion" should be --portion--;

Col. 11, Line 39 (Claim 14), "anparatus" should be --apparatus--; and

Col. 12, Line 34 (Claim 15), delete second "than".

Signed and Sealed this

Second Day of August, 1988

Attest:

DONALD J. QUIGG

Attesting Officer

Commissioner of Patents and Trademarks